United States Patent [19]

Michael et al.

[11] Patent Number: 4,767,143
[45] Date of Patent: Aug. 30, 1988

[54] ROBOT HAND

[75] Inventors: Leroy D. Michael; Michael W. Green, both of King County, Wash.

[73] Assignee: The Boeing Company, Seattle, Wash.

[21] Appl. No.: 17,449

[22] Filed: Feb. 24, 1987

[51] Int. Cl.⁴ .......................... B23Q 1/04; B66C 1/02
[52] U.S. Cl. ....................................... 294/65; 414/72; 414/107
[58] Field of Search ................ 294/65, 64.1; 271/185, 271/194, 195; 414/72, 744 B, 627, 752, 737, 107

[56] References Cited

U.S. PATENT DOCUMENTS

| | | |
|---|---|---|
| 2,941,499 | 6/1960 | Gutzmer . |
| 3,033,381 | 5/1962 | Noble et al. . |
| 3,172,550 | 3/1965 | Caldwell . |
| 3,349,927 | 10/1967 | Blatt . |
| 3,542,412 | 11/1970 | Koch et al. ........................ 294/65 |
| 3,696,596 | 10/1972 | Wegscheid . |
| 3,724,687 | 4/1973 | Marschke et al. . |
| 3,820,667 | 6/1974 | Critchlow et al. . |
| 3,860,280 | 1/1975 | Karlsson . |
| 3,888,359 | 6/1975 | Moline . |
| 3,912,317 | 10/1975 | Ohnaka . |
| 3,921,827 | 11/1975 | Joice . |
| 4,180,258 | 12/1979 | Wildforster . |
| 4,200,420 | 4/1980 | Cathers et al. ........................ 414/72 |
| 4,228,993 | 10/1980 | Cathers . |
| 4,361,062 | 11/1982 | Reiff . |
| 4,370,092 | 1/1983 | Healy . |
| 4,411,574 | 10/1983 | Riley . |
| 4,419,039 | 12/1983 | Bengston . |

Primary Examiner—James B. Marbert
Attorney, Agent, or Firm—Finnegan, Henderson, Farabow, Garrett & Dunner

[57] ABSTRACT

A robot hand for grasping objects having substantially planar faces includes a base and a plurality of arms extending from the base. A plurality of vacuum cups are supported on and radially movable along the arms. Pivotal drive means pivot the arms, radial drive means move the cups along the arms, and vacuum means apply a vacuum to the cups. The cups are readily positioned to permit lifting and transporting of objects such as plies and the like, including those objects having irregular planar shapes.

16 Claims, 4 Drawing Sheets

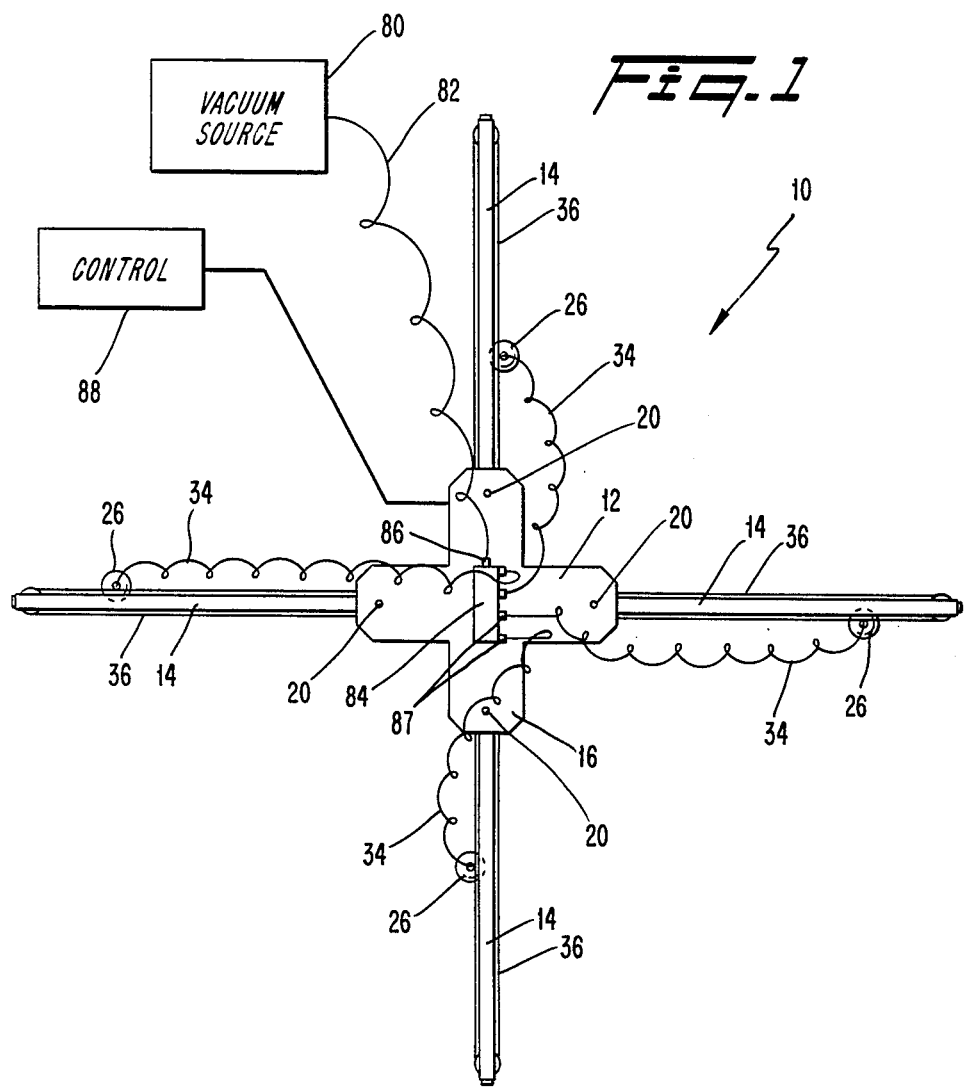

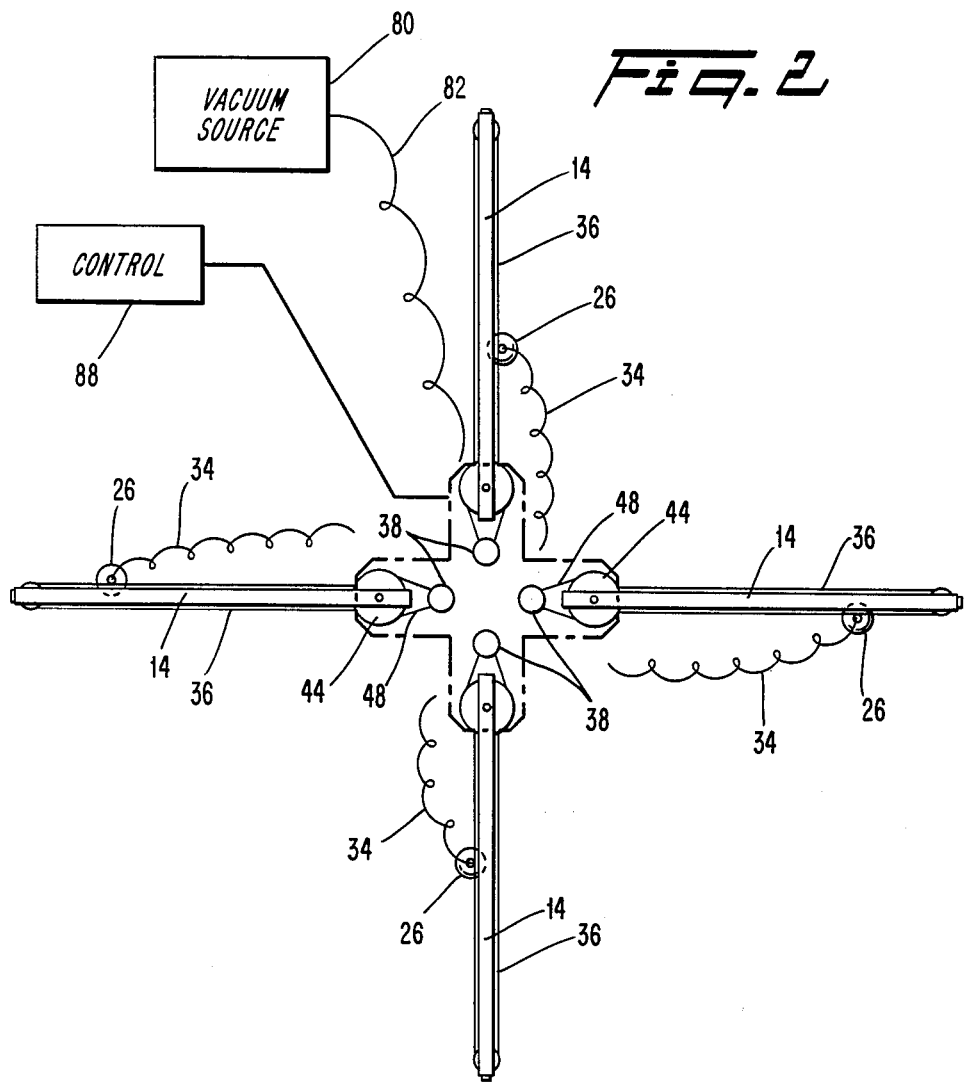

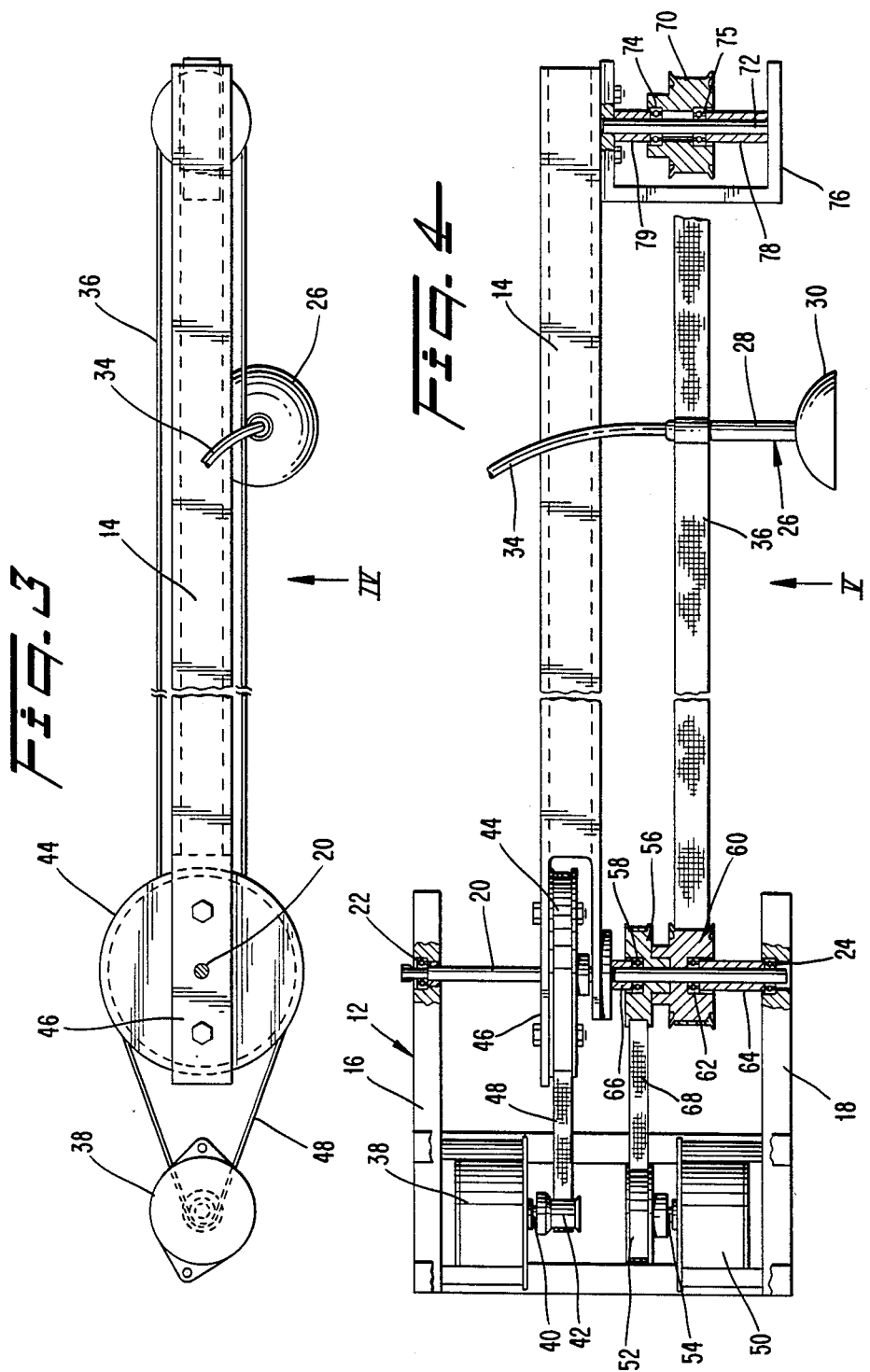

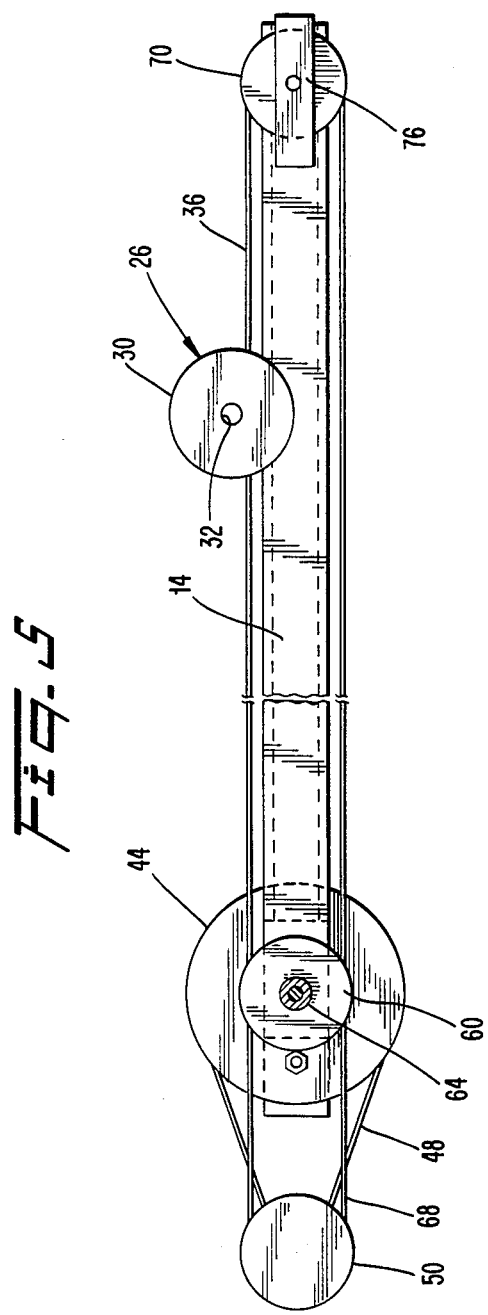

ROBOT HAND

BACKGROUND OF THE INVENTION

The present invention relates to article transfer systems; and more particularly to a robot hand for picking up irregularly shaped objects having a planar surface, such as composite plies.

In manufacturing and construction it is often necessary to grasp sheet materials of wood, glass, plastic, ceramic, metal or composite materials. Handling and positioning of such sheet materials frequently requires a large expenditure of manual labor. To reduce the large expense associated with such material handling, a number of systems have been designed to facilitate handling and positioning sheet materials.

One such device is the Sheet Orienting and Transporting Frame disclosed in the U.S. Pat. No. 4,228,993 to Cathers. This patent discloses a device in which sheets are grasped by suction cups mounted on the ends of engaging arms that extend from a base plate which is fixed on a movable support arm. The spacing of the suction cups may be periodically adjusted, so as to correspond to the shape of the sheets being grasped, by manually telescoping the engaging arms in and out and by manually adjusting the pivotal position of the arms about the point at which the arms are connected to the base plate. This transporting frame is best utilized for transporting sheets of substantially the same shape and size, or for transporting sheets in which the shape and size of the sheets being grasped changes only occasionally so that manual readjustment of the adjusting arms is only occasionally required. However, where sheets of a variety of shapes and sizes are to be transported or oriented and where the shape and size of the sheets being transported changes often, it becomes necessary to have a capability for rapidly readjusting the spacing of the suction cups over a large variety of configurations at just a moments notice. It is further necessary that such readjustment be achievable without time consuming manual readjustments of cup positions.

One vacuum grasping hand that is capable of grasping sheets of a variety of shapes and sizes includes a planar surface to which an array of vacuum cups are fixed so as to cover the surface. The vacuum cups are connected to a source of vacuum in a manner that permits the cups to be selectively connected to the vacuum source so that the spacing of the vacuum cups to which suction is being applied may be easily changed. When the shape of the surface being grasped changes, the cups to which the suction source is applied is correspondingly changed. A hand of this type has increased versatility, but the large array of vacuum cups and means for connecting the vacuum cups to the source of suction results in a heavy grasping hand that can only be held and manipulated with a large expenditure of energy by a large robot.

In another suction grasping hand, a grasping hand has been achieved which permits variable spacing of vacuum cups in a hand that weighs considerably less than the Northrup hand. The Vertol hand includes four cups mounted on opposite ends of two transverse members, each of which are connected to a rack which interacts with a rotating pinion. Rotating the pinion in the clockwise direction moves the cups further apart while rotating the pinion in the opposite direction brings the vacuum cups closer together. The hand permits a certain level of mechanical cup adjustment in a hand that is relatively light so as to be supportable and movable with a smaller expenditure of energy by a smaller robot than would be required with other larger hands. However, for grasping irregularly shaped sheets, it is desirable that each of the vacuum cups be movable with respect to each other and be capable of assuming irregular spacing. Such irregular spacing cannot be attained when vacuum cups are fixed on transverse members that are movable in only two directions.

SUMMARY OF THE INVENTION

Accordingly, it is an object of the invention to provide a vacuum cup grasping hand having a plurality of vacuum cups that may be mechanically and rapidly moved to a large variety of irregular spacings so as to be capable of grasping irregularly shaped planar surfaces.

It is another object of the present invention to provide a grasping hand having a light weight that may be manipulated by a relatively small robot with a minimal expenditure of energy.

It is a further object of the present invention to provide a grasping hand that can be quickly and easily adjusted for grasping sheets of different configurations without manual readjustment of the positions of the vacuum cups.

Additional objects and advantages of the present invention will be set forth in part in the description that follows and in part will be obvious from the description or may be learned by practice of the invention. The objects and advantages of the invention may be realized and obtained by the apparatus particularly pointed out in the appended claims.

To achieve the objects and in accordance with the purpose of the invention, as embodied and as broadly described herein, the apparatus of this invention for grasping an object having a substantially planar face comprises a base; a plurality of arms extending outwardly from the base, the arms each having an inner and outer end, each of the arms pivotably mounted on the base for rotation about an axis at the inner end for rotating each of the arms through an arc of a selected angle; a plurality of vacuum cups, one of the cups being supported on each of the arms, each of the cups being oriented in the same direction and being radially movable relative to and along a respective pivotable arm to selected contact positions relative to the planar surface of the object to be grasped; a plurality of pivotal drive means, each of the drive means for pivoting a corresponding one of the arms; a plurality of radial drive means, each of the radial drive means for moving a corresponding one of the cups relative to and along the length of the arms; vacuum means for applying a vacuum to the plurality of vacuum cups; means for engaging the pivotal drive means, the radial drive means and the vacuum means whereby the vacuum cups are moved to selected contact positions to grasp the object at spaced locations on the planar face of the object.

The accompanying drawings, which are incorporated in and constitute a part of this specification, illustrate the presently preferred embodiment of the invention and, together with the description, serve to explain the principles of the invention.

BRIEF DESCRIPTION OF THE DRAWINGS

FIG. 1 is a plan view of a robot hand constructed according to one preferred embodiment of the present invention.

FIG. 2 is a partially sectional view of the robot hand shown in FIG. 1.

FIG. 3 is an enlarged fragmentary plan view of one of the robot arms of FIG. 2.

FIG. 4 is an elevation view of the robot arm shown in FIG. 3 taken in the direction of arrow IV and including the spaced mounting plates.

FIG. 5 is a bottom plan view of the robot arm shown in FIG. 4 taken in the direction of arrow V.

DESCRIPTION OF THE PREFERRED EMBODIMENT

Reference will now be made in detail to a presently preferred embodiment of the invention, an example of which is illustrated in the accompanying drawings. Throughout the drawings, like reference characters are used to designate like elements.

An apparatus for grasping an object having a substantially planar face is illustrated in FIG. 1. The illustrated grasping apparatus 10 may be attached to a robot arm or other machine where grasping a substantially planar surface is required. Grasping apparatus 10 is capable of grasping sheets of composite ply material having a large variety of configurations. It will be appreciated that the invention may be practiced on planar surfaces of other types of materials, such as wood, glass, plastic, ceramic or metal.

According to the present invention, a base and a plurality of arms extending outwardly from the base are provided. The arms each have an inner and an outer end and each of the arms is pivotably mounted for rotation about an axis on the base adjacent the inner end for rotating each arm through an arc of a selected angle. As embodied herein, and as illustrated in FIGS. 1 and 4, grasping apparatus 10 includes a base 12 from which a plurality of arms 14 outwardly extend.

As shown in FIG. 4, base 12 includes upper and lower mounting plates, 16, 18 respectively, that are spaced from each other and fixed to each other by conventional brackets or bolts. Plates 16, 18 and arms 14 are preferably comprised of a material that is rigid, strong and of a light weight, as for example, aluminum or a composite material. Preferably, arms 14 each have a hollow square cross section and are preferably comprised of a material that is rigid, strong and of light weight, as for example, aluminum or a composite material. A plurality of shafts 20, corresponding to the number of arms 14, are mounted between the upper and lower mounting plates 16, 18 at positions that are extended outward from the central portion of base 12. Each shaft 20, one of which is shown in FIG. 4, is rotatably mounted on its own set of upper bearings 22 and lower bearinqs 24 that are set in the upper mounting plate 16 and lower mounting plate 18, respectively.

An inner end of each of the plurality of arms 14 is mounted on a corresponding shaft 20 so as to be pivotable with shaft 20 as the shaft turns in bearings 22 and 24. When the grasping apparatus is maneuvered above the planar surface of an object to be grasped, each of the plurality of arms 14 is pivotable through an angle of at least 360° divided by the number of arms. Preferably, each arm 14 is pivotable through an arc of at least 180°. Because each of the shafts 20 are arranged parallel to each other and because the arms 14 are preferably attached to shafts 20 at the same point on each of the shafts, the arms pivot through arcs in a single plane. Preferably, this plane is coplanar to the surface of the object being grasped when the grasping apparatus 10 is aligned and positioned above the planar surface of the object before grasping.

According to the present invention, a plurality of vacuum cups is provided, one of the cups being supported on each of the arms. The cups are oriented in the same direction and are radially movable relative to and along the pivotable arms to selected contact positions relative to the planar surface of the object to be grasped. As embodied herein, a vacuum cup 26 is mounted on each arm 14 so as to be pivoted about respective shafts 20 when its associated arm 14 is pivoted. Vacuum cups 26 are preferably suction cups comprised of a pliable material such as flexible rubber. Each cup 26 has a base 28 made of a firm material such as hard rubber and a rim 30 made of a softer more flexible material, as for example a soft flexible rubber. Each cup 26 also includes a vent passage 32, as can be seen in FIG. 5, which connects the base of the cup to a suction hose 34. The cups may be mounted or affixed directly on a continuous belt or chain 36 mounted on each of the arms 14, or the cups may be mounted on tracks (not shown) running along the side of each arm. The openings of cups 26 all face in the same direction, e.g., downwardly, so that they all can be used in lifting an object by suction attachment to the planar surface of the object.

In accordance with the present invention, a plurality of pivotal drive means is provided, each of the pivotal drive means for pivoting a corresponding one of the arms. As embodied herein, and as best shown in FIGS. 2–4, the pivotal drive means comprises a plurality of stepper motors 38 mounted on upper mounting plate 16. Stepper motors 38 are preferably conventional electric stepper motors that may be controlled to rotate at very small increments of rotation. Each stepper motor 38 has an output drive shaft 40 that is rotationally driven by the motor. A first drive pulley 42 is mounted on each shaft 40 so as to be driven for rotation when stepper motor 38 rotates shaft 40.

Each pivotal drive means further comprises a first driven pulley 44 mounted on shaft 20 and connected to arm 14 so that pulley 14, shaft 20, and arm 14 all rotate in unison. Pulley 44 and arm 14 are connected along a top portion 46 at the inner end of arm 14 which as shown is cut into an approximated C-shape to accommodate pulley 44. A first belt 48 engages first drive pulley 42 and first driven pulley 44 so as to pivot driven pulley 44 and arm 14 when stepper motor 38 rotates drive pulley 42.

According to the present invention, a plurality of radial drive means, each of said radial drive means for moving a corresponding one of said cups relative to and along the length of said arms is provided. As embodied herein, each radial drive means includes a second stepper motor 50 mounted on lower mounting plate 18. Second stepper motor 50 is preferably a conventional electric stepper motor that may be controlled to rotate at very small increments of rotation. A second drive pulley 52 is mounted on an output drive shaft 54 of second stepper motor 50. A second driven pulley 56, rotatably mounted on shaft 20 by bearings 58, is connected to a third driven pulley 60 rotatably mounted on shaft 20 by bearings 62 so that pulleys 56 and 60 rotate in unison. Spacers 64 and 66 hold driven pulleys 56 and 60 at fixed points along shaft 20. A second drive belt 68 engages second drive pulley 52 and second driven pulley 56 to turn the second driven pulley 56 and thereby the third driven pulley 60 when second stepper motor 50 turns second drive shaft 54.

At the outer end of each arm 14 is a fourth driven pulley 70. Pulley 70 is rotatably mounted on a shaft 72 by bearings 74 and 75. Shaft 72 itself is mounted in a C clamp 76 that is fixed to the bottom of the outer end of arm 14. The C clamp is preferably a C-shaped bracket having a top horizontal section, a side section and a bottom horizontal section. Shaft 72 may be journaled in holes in top and bottom horizontal sections of the C-shaped bracket. Pulley 70 is centrally positioned along shaft 72 by spacers 78, 79 so as to be spaced the same distance from arm 14 as pulley 60 is spaced from arm 14.

Continuous drive chain 36 is mounted on third driven pulley 60 and fourth driven pulley 70, and each vacuum cup 26 is attached to a fixed position on the drive chain 36 associated with its arm 14 so that each vacuum cup 26 is radially movable along its arm 14 when its third driven pulley 60 is rotated to rotate drive chain 36. It should be appreciated, that drive chain 36 may be otherwise embodied as a belt and that driven pulleys 60 and 70 may be otherwise embodied as rotatable sprockets.

According to the present invention, vacuum means for applying a vaccum to the plurality of vacuum cups is provided. As embodied herein, a source of vacuum 80, as for example a vacuum pump, is provided for applying vacuum to vacuum cups 26 through a vacuum hose 82 connected to a distributor 84 which distributes vacuum to the vacuum hoses 34, one of which is connected to each vacuum cup 26.

Vacuum pressure distributor 84 comprises a closed chamber box mounted on upper mounting plate 16. As embodied herein, the vacuum distributor has an inlet 86 connected to the vacuum source and a plurality of outlets 87 each connected to a vacuum hose 34. The vacuum hoses are preferably comprised of conventional flexible or coiled non-collapsible vacuum tubing material.

According to the present invention, means for energizing the pivotal drive means, the radial drive means and the vacuum means whereby the vacuum cups are moved to selected contact positions to grasp the object at spaced locations on the planar face of the object being grasped are provided. It is preferred that the energizing means include means for operating each of the pivotal drive means independently, means for operating each of the radial drive means independently and means for turning the vacuum means on and off. In the simplest form, these means may be a plurality of on/off or 2-way switches. Alternatively, a centralized control 88 may be provided in connection with vacuum source 80 and grasping apparatus 10 for operating each pivotal drive means, each radial drive means and the vacuum means. Control 88 and vacuum source 80 may be remote from the base and plurality of arms so as to make grasping apparatus 10 both light and easily maneuverable from a variety of positions.

In operation, the robot hand of the present invention can grasp various irregular planar surfaces and the arms of the hand can be pivoted and cup positions along the arms can be changed between each grasping operation. Thus, when the robot hand is attached to the end of a robot arm, objects with irregular planar surfaces may be picked up one after another. The plurality of arms on the robot hand allows cups to be positioned at various corners of an object being grasped.

In one application where plies of composite material must be handled during aircraft manufacturing, a single robot hand mounted on a robot arm can be used to pick up a wide variety of composite plies. The robot arm with attached robot hand can be mounted on a mobile unit so that the grasped plies may be moved to various locations in the manufacturing plant.

It will be apparent to those skilled in the art that modifications and variations can be made in the robot hand apparatus of this invention. The invention in its broader aspects is, therefore, not limited to the specific details, representative apparatus, and illustrative examples shown and described herein above. Thus, it is intended that all matter contained in the foregoing description or shown in the accompanying drawings shall be interpreted as illustrative and not in a limiting sense, and the present invention is to cover modifications and variations of this invention provided they come within the scope of the appended claims and their equivalents.

What is claimed is:

1. An apparatus for grasping an object having a substantially planar face, comprising:
    a base;
    a plurality of arms extending outwardly from said base, said arms each having an inner and an outer end, each of said arms pivotably mounted on said base for rotation about an axis adjacent the inner end for rotating each said arm through an arc of a selected angle;
    a plurality of vacuum cups, one of said cups being supported on each of said arms, each of said cups being oriented in the same direction and being radially movable relative to and along said pivotable arms to selected contact positions relative to the planar face of the object to be grasped;
    a plurality of pivotal drive means, each of said pivotal drive means for pivoting a corresponding one of said arms;
    a plurality of radial drive means, each of said radial drive means for moving a corresponding one of said cups relative to and along the length of said arms;
    vacuum means for applying a vacuum to said plurality of vacuum cups; and
    means for energizing said pivotal drive means, said radial drive means and said vacuum means whereby said vacuum cups are moved to said selected contact positions to grasp the object at spaced locations on the planar face of the object.

2. An apparatus for grasping as recited in claim 1, wherein said means for energizing includes means for operating each of said pivotal drive means independently and means for operating each of said radial drive means independently.

3. An apparatus for grasping as recited in claim 2, further comprising a plurality of parallel shafts rotatably mounted on said base, the longitudinal axis of each of said shafts corresponding to an axis about which one of said arms pivot, the first end of each of said arms being mounted on a respective one of said fixed shafts for pivoting through an arc of a selected angle.

4. An apparatus for grasping as recited in claim 3, wherein each of said plurality of pivotal drive means comprises:
    a first stepper motor mounted on said base, said first motor having a first drive shaft rotatably driven by said first motor;
    a first drive pulley coaxially mounted on said first drive shaft;
    a first driven pulley mounted on the shaft on which said corresponding arm is mounted, said first driven pulley engaging said corresponding arm; and a first belt, said first belt engaging said first drive pulley and said first driven pulley for pivoting said corresponding arm.

5. An apparatus for grasping as recited in claim 4, wherein each of said arms is pivotable through an arc of at least 180° by one of said plurality of first stepper motors.

6. An apparatus for grasping as recited in claim 3, wherein each of said plurality of radial drive means comprises:

a second stepper motor mounted on said base, said second motor having a second drive shaft rotatably driven by said second motor;

a second drive pulley axially mounted on said second drive shaft;

a second driven pulley rotatably mounted on the fixed shaft on which said corresponding arm is mounted;

a third driven pulley rotatably mounted on the fixed shaft on which said corresponding arm is mounted, said third driven pulley rotatably engaged with said second driven pulley;

a second belt, said second belt engaging said second drive pulley and said second driven pulley to turn said second and third driven pulleys when said second motor turns said second drive shaft;

a fourth driven pulley rotatably mounted on the second end of said arm; and a continuous drive chain mounted on said third and fourth driven pulleys, the vacuum cup mounted on said corresponding arm being attached to said drive chain, said vacuum cup being radially movable along said arm when said third driven pulley is rotated to rotate said drive chain.

7. An apparatus for grasping according to claim 6 further comprising a plurality of C-shaped brackets each having a top horizontal section, a side vertical and a bottom horizontal section, wherein one of said plurality of C-shaped brackets is mounted on the outer end of each of said plurality of arms and the fourth driven pulley on each of said arms is rotatably mounted in said bracket.

8. An apparatus for grasping as recited in claim 2, wherein each of said arms has a hollow square cross section and is comprised of a rigid, strong and light weight material.

9. An apparatus for grasping as recited in claim 2, wherein said vacuum means further comprises a vacuum pump and a plurality of vacuum hoses, said vacuum hoses connecting said vacuum pump to each of said plurality of vacuum cups.

10. An apparatus for holding as recited in claim 9, wherein said vacuum means further comprises a vacuum pressure distributor mounted on said base, said distributor in vacuum connection with said vacuum pump through one of said plurality of hoses and in vacuum connection with each of said vacuum cups through the remainder of said plurality of vacuum hoses.

11. An apparatus for holding as recited in claim 9, wherein said means for energizing and vacuum pump are remote from said base and plurality of arms.

12. An apparatus for grasping an object having a substantially planar face, comprising:

a base;

a plurality of parallel shafts rotatably mounted on the base;

a plurality of arms extending outwardly from said base, said arms each having an inner and an outer end, each of said arms pivotably mounted on one of said shafts at said inner end for rotating each said arm through an arc of a selected angle;

a plurality of continuous drive chains, one of said chains mounted for rotation between said base and the outer end of each of said arms;

a plurality of vacuum cups, one of said vacuum cups attached to each of said drive chains, each of said cups being oriented in the same direction and being radially movable by said respective drive chain relative to and along one of said pivotal arms to a selected contact position relative to the planar face of the object to be grasped;

a plurality of first stepper motors mounted on said base, each of said first stepper motors for pivoting a corresponding one of said arms;

a plurality of second stepper motors mounted on said base, each of said second stepper motors for rotating one of said plurality of drive chains to radially move the corresponding vacuum cup along the arm;

vacuum means for applying a vacuum to said plurality of vacuum cups; and means for energizing said pivotable drive means, said radial drive means and said vacuum means whereby said vacuum cups are moved to said selected contact positions to grasp the object at spaced locations on the planar face of the object.

13. An apparatus for grasping as recited in claim 12, wherein said means for energizing includes means for operating each of said first stepper motors independently and means for operating each of said second stepper motors independently.

14. An apparatus for grasping as recited in claim 12, wherein each of said arms is pivotable through an arc of at least 180° by one of said plurality of first stepper motors.

15. An apparatus for grasping as recited in claim 12, wherein said vacuum means further comprises a vacuum pump and a plurality of vacuum hoses, said vacuum hoses connecting said vacuum pump to each of said plurality of vacuum cups.

16. An apparatus for grasping as recited in claim 15, wherein said means for energizing and said vacuum pump are remote from said base and plurality of arms.

* * * * *